United States Patent [19]

Tolson

[11] Patent Number: 5,096,102
[45] Date of Patent: Mar. 17, 1992

[54] ARTICLE CARRIER MOUNTED TO LICENSE PLATE RECEIVER OF A MOTOR VEHICLE

[76] Inventor: Carl J. Tolson, 56 Polomer Real, Campbell, Calif. 95008

[21] Appl. No.: 524,901

[22] Filed: May 18, 1990

[51] Int. Cl.$^5$ ............................................... B60R 9/00
[52] U.S. Cl. ..................... 224/42.45 R; 224/42.03 B; 224/917; 224/42.43; 224/42.07
[58] Field of Search ............... 224/42.45 R, 42.03 R, 224/42.03 A, 42.03 B, 42.06, 42.07, 42.08, 917, 42.43, 42.44; 40/200, 209; 403/4, 3

[56] References Cited

U.S. PATENT DOCUMENTS

| | | | |
|---|---|---|---|
| 2,011,004 | 8/1935 | Love | 40/200 |
| 4,035,093 | 7/1977 | Redshaw | 403/4 |
| 4,597,603 | 7/1986 | Trabert | 403/4 |
| 4,676,414 | 6/1987 | Deguevara | 224/42.03 B |
| 4,971,237 | 11/1990 | Davis | 224/42.07 |

FOREIGN PATENT DOCUMENTS 1085354  9/1980  Canada .......................... 224/42.06

*Primary Examiner*—Linda J. Sholl
*Attorney, Agent, or Firm*—Terry M. Crellin

[57] ABSTRACT

A carrier mounted to the license plate receiver of a motor vehicle for carrying items such as bicycles and skis comprises a substantially planar mounting plate for attachment to the license plate receiver using the attachment means employed in attaching a license plate to the license plate receiver, with the license plate mounted over the mounting plate. A substantially planar support plate is firmly connected to the bottom edge of the mounting plate to extend substantially perpendicular from the mounting plate away from the license plate receiver. An elongate post is removably mounted generally upright to the support plate. A cross bar is mounted adjacent to the upper end of the post, with the cross bar extending substantially transversely of the post, and the items to be carried are mounted to the cross bar.

20 Claims, 2 Drawing Sheets

ARTICLE CARRIER MOUNTED TO LICENSE PLATE RECEIVER OF A MOTOR VEHICLE

BACKGROUND OF THE INVENTION

1. Field of the Invention

The present invention relates to apparatus which is attached to an end of a motor vehicle for carrying such items as bicycles, skis, etc. thereon. In particular, the invention relates to a carrying apparatus in which the base support for the apparatus is attached to the license plate receptacle of the motor vehicle in a semi-permanent fashion, and the remainder of the apparatus is removable from the base support when not in use so as to be storable in the truck of the motor vehicle, for example.

2. State of the Art

Various devices have been proposed and used for carrying items exterior of a motor vehicle. Storage racks have been provided on the roof of the motor vehicle as well as on the trunk deck. Apparatus which is temporarily attached to the bumper of the motor vehicle has been used for carrying such items as bicycles and skis. These carriers are rather clumsy, however, and require elaborate means for mounting the carriers to the motor vehicle. The mounting means often results in scratching of the bumper and body of the vehicle. In addition, the mounting means and carries often impede access to the truck or motor compartment of the motor vehicle.

3. Objectives

A principal objective of the invention is to provide a novel, simple, rather inexpensive carrier which is attached to the license plate receiver of the motor vehicle.

An additional objective of the invention is to provide such a carrier which comprises a base support which is adapted to be permanently mounted to the license plate receptor, with the license plate mounted over the base support.

Another objective of the present invention is to provide such a carrier having the base support mounted to the license plate receptor, with the remainder of the apparatus being quickly and easily assembled to and removed from the base support without requiring any tools or elaborate procedures.

A still further objective of the present invention is to provide such a carrier mounted to the license plate receptor which does not impede access to the trunk or motor compartment of the motor vehicle.

BRIEF DESCRIPTION OF THE INVENTION

The above objectives are achieved in accordance with the present invention by providing a novel, unique carrier that is mounted to the license plate receptor of a motor vehicle and is capable of carrying such items as bicycles, skis, etc. without impeding access to the trunk or motor compartment of the motor vehicle. The carrier does not require attachment to the trunk lid, nor does it come into contact with any other portion of the body of the motor vehicle with the exception of the upper surface of the bumper immediately below the license plate receptor. Accordingly, there is no chance of scratching or marring the surface of the body of the motor vehicle while using the carrier.

The carrier comprises a base support that is permanently mounted to the license plate receptor of the motor vehicle, with the license plate being installed over the base support. The remainder of the carrier, including an elongate post, means for mounting the post upright from the base support, and a cross bar mounted to the post, can quickly and easily be installed and removed from the base support without the use of tools or elaborate procedures. The carrier is readily available when needed and can be removed and stored out of the way in the trunk of the motor vehicle when not needed.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
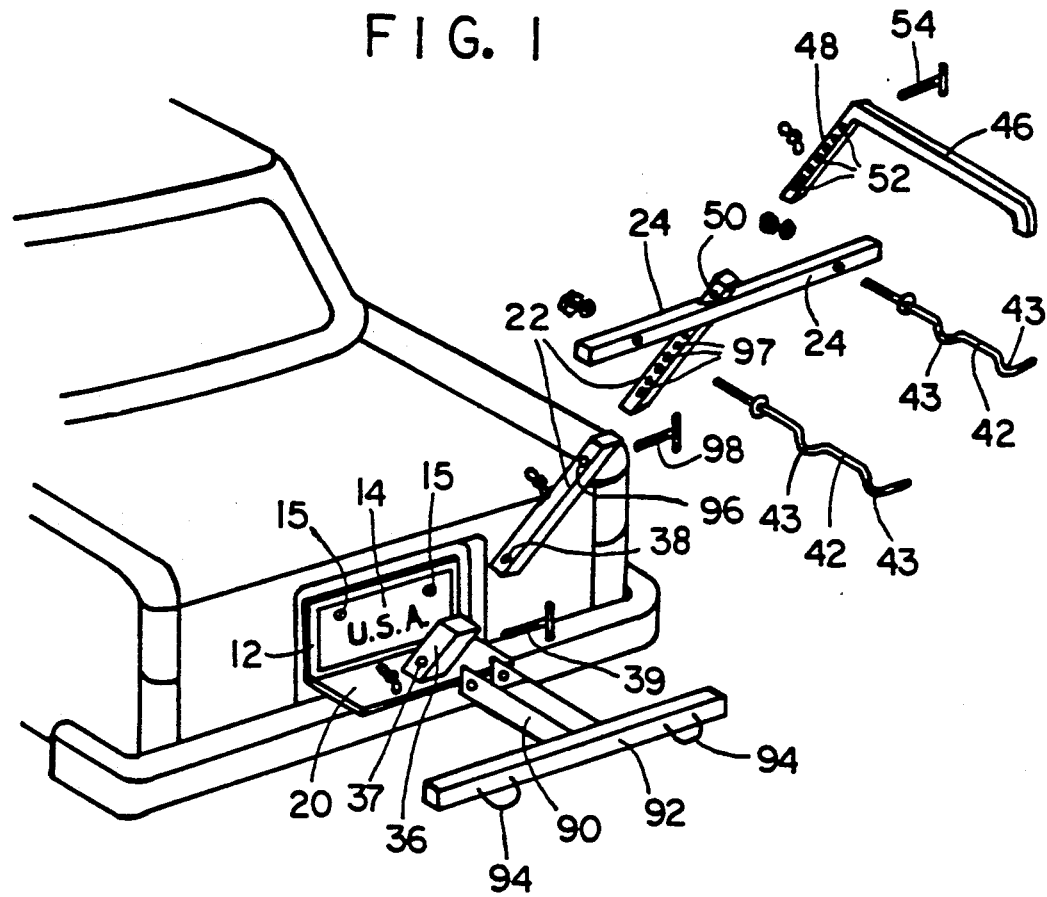
FIG. 1 is a pictorial representation of a carrier in accordance with the present invention as installed to the license plate receptacle of a motor vehicle, with the carrier incorporating means for mounting one or two bicycles thereto.

Referring now to the drawings, a carrier is shown that is adapted to be mounted to the license plate receiver of a motor vehicle for carrying items such as bicycles and skis. The novel carrier of the present invention comprises a substantially planar mounting plate 12 that is to be attached to the license plate receiver of the motor vehicle. The mounting plate 12 is attached to the license plate receiver using the attachment means employed in attaching a license plate to the license plate receiver, with the license plate 14 being mounted over the mounting plate 12.

Figure 2:
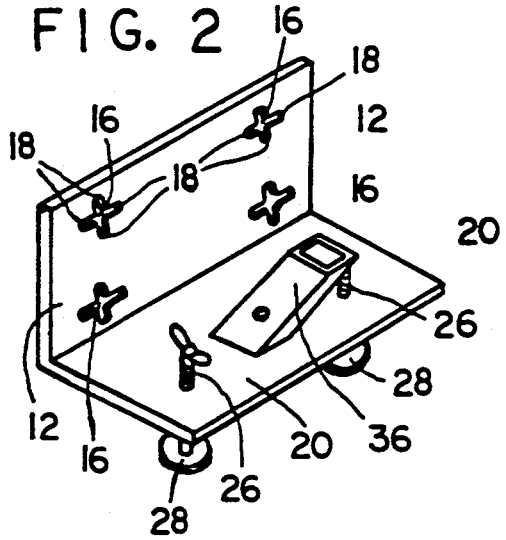
FIG. 2 is an isolated pictorial view of the base support structure of the carrier of FIG. 1.
Figure 3:
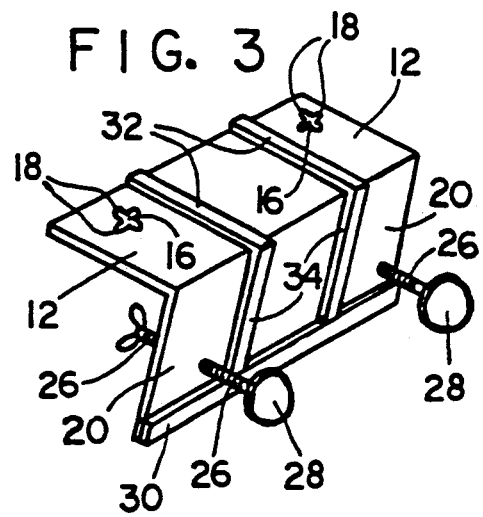
FIG. 3 is a pictorial view of the base support structure of FIG. 2, showing the bottom and back sides of the structure.

As shown in the drawings, the mounting plate 12 preferably has at least one pair of openings 16 adjacent to the upper side of the mounting plate 12. The openings 16 are spaced apart so as to be capable of being aligned with the threaded receptacles in the license plate receiver of the motor vehicle. The threaded receptacles receive screw attachment members as well known in the art for attaching license plates to the license plate receiver. To accommodate various spacings of screw attachments found on different motor vehicles, the openings 16 can have two elongate loops or ears 18 extending at 90° orientation with each other as best shown in FIGS. 2 and 3. One of the loops 18 of each opening 16 is oriented with its longitudinal axis parallel to the elongate axis of the mounting plate 12, with the other loop 18 of each opening 16 being oriented with its longitudinal axis essentially perpendicular with the longitudinal axis of the first loop 18 of that opening 16. The loops 18 allow the mounting plate 12 to adapt to the screw attachments of license plate receivers on almost any motor vehicle.

In attaching the carrier of the present invention to the motor vehicle (as shown in FIG. 1), the mounting plate 12 is positioned in the license plate receiver area of the motor vehicle. The license plate 14 is then placed over the mounting plate 12, and the attachment screws 15 firmly attach the license plate 14 and the mounting plate 12 to the license plate receiver area of the motor vehicle. Some motor vehicles have a second pair of screw attachments spaced adjacent to the lower side of the license plate receiver area. A second pair of openings 16 as shown in FIG. 2 can be used if desired to accommodate motor vehicles having such second pair of screw attachments.

Normally the license plate receiver area of the motor vehicle will have more than sufficient strength to support the mounting plate 12 and carry the remainder of the carrier and the items carried by the carrier. If necessary, a stiffening plate (not shown in the drawings) can be installed on the inboard side of the license plate receiver area, with the screw attachments adapted to screw through the license plate receiver and into the stiffening plate behind the license plate receiver. As mentioned previously, the license plate receiver area of almost all motor vehicles has adequate rigidity and strength such that the use of a stiffening plate is rarely necessary.

A substantially planar support plate 20 is firmly connected to the bottom edge of the mounting plate 12, with the support plate 20 extending substantially perpendicular from the mounting plate 12 in a direction away from the license plate receiver. An elongate post 22 is provided extending generally upwardly from the support plate 20. Means are provided for removably mounting the post 22 generally upright from the support plate 20. A cross bar 24 is mounted adjacent to the upper end of the post 22, with the cross bar 24 extending substantially transversely of the post 22. Means as will be more fully described hereinafter are provided in conjunction with the cross bar 24 for mounting the items to be carried to the cross bar 24.

Adjustable foot means are advantageously coupled with the support plate 20. The foot means extend downwardly from the support plate 20 to rest on a support surface such as the bumper of the motor vehicle. The foot means provide support for the outwardly extending end of the support plate 20. Advantageously, the foot means comprises at least one threaded rod 26 engaged in a respective internally threaded bore in the support plate 20. The lower end of each threaded rod 26 has a foot plate 28 for engagement with the bumper of the motor vehicle. Means are provided at the upper end of each threaded rod 26 for turning the rod 26 so as to move the foot plate 28 in an adjustable movement toward or away from the bumper of the motor vehicle.

To provide rigidity and strength to the support plate 20, a reinforcing bar 30 can be provided to extend along the support plate 20 adjacent to the side edge of the support plate 20 remote from the mounting plate 12 as best shown in FIG. 3. To provide rigidity and strength to the mounting plate 12, at least one reinforcing bar 32 can be provided extending along the mounting plate 12 from the top side edge to the side edge thereof attached to the support plate 20 as shown in FIG. 3. Preferably, two spaced apart reinforcing bars 32 are provided. Additional reinforcement bars 34 can be provided on the underside of the support plate 20 extending from the ends of the bars 32 to the bar 30 as shown in FIG. 3

The post 22 is preferably mounted to the support plate 20 by means comprising a hollow conduit 36 attached to the support plate 20 and extending upwardly therefrom. The lower end of the post 22 is adapted to be removably received longitudinally within the hollow conduit 36. The hollow conduit 36 is preferably oriented with its longitudinal axis slanting in a direction away from the mounting plate 20 such that the longitudinal axis forms an acute angle with the support plate 20 of at least about 80 degrees. This allows the post 22 to slant away from the motor vehicle to carry the items to be carried out of contact with the motor vehicle.

The lower end of the post 22 is removably affixed to the hollow conduit 36 by means comprising a transverse opening 37 through the hollow conduit 36 and a corresponding transverse opening 38 through the lower end of the post 22 for alignment with the transverse opening 37 in the hollow conduit 36. A pin 39 engages the aligned openings 37 and 38 in the hollow conduit 36 and the lower end of the post 22 to retain the post 22 in the hollow conduit 36.

As mentioned previously, means are provided in conjunction with the cross bar 24 for mounting items to be carried to the cross bar 24. As shown in FIG. 1, means are provided which is useful in carrying a bicycle. The means for mounting the bicycle (the bicycle itself is not shown in the drawings) to the cross bar 24 comprises two elongate rods 42 attached to the cross bar 24 and spaced from each other. The rods 42 extend in a direction generally away from the mounting plate 12 and support plate 20 to support a bicycle suspended therefrom. As shown, two pair of curved wells 43 are provided in the rods 42 for receiving the frames of two separate bicycles carried side by side on the carrier.

An elongate clamp bar 46 is removably coupled to the post 22 and cross bar 24 to extend outwardly from the cross bar 24 in substantially the same direction as the rods 42. The clamp bar 46 is positioned between the rods 42 to engage the portion of a bicycle supported between the rods 22 and firmly hold the bicycle suspended on the rods 42.

In the preferred embodiment as illustrated, the elongate post 22 is hollow, with the cross bar 24 being mounted to an upper side edge of the post 22 such that the hollow upper end of the post 22 is open. The elongate clamp bar 46 has a mounting stud 48 extending from one end thereof substantially transverse to the elongate axis of the clamp bar 46. The mounting stud 48 is adapted to be inserted within and withdrawn from the open end of the post 22. At least one transverse opening 50 is provided through the upper end of the post 22, with at least one corresponding, transverse opening 52 through the mounting stud 48 for alignment with the transverse opening 50 in the upper end of the post 22. A retainer pin 54 is provided for engaging the aligned openings 50 and 52 in the mounting stud 48 and the upper end of the post 22 to retain the mounting stud 48 in the hollow, open end of the post 22.

Figure 4:
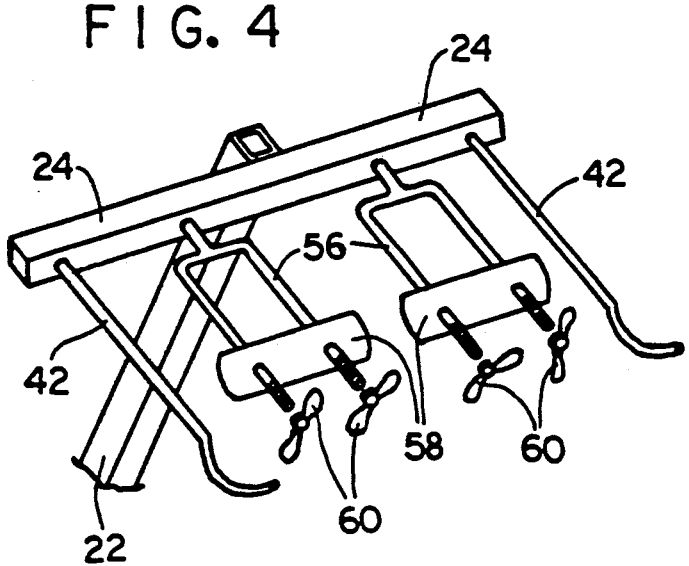
FIG. 4 is a pictorial view of the upper portion of the post of a carrier in accordance with the present invention showing means for mounting both a bicycle and one or two pairs of skis to the carrier.

A carrier capable of carrying two pair of skis along with a bicycle is shown in FIG. 4. In such embodiment, the cross bar 24 includes ski carrying means comprising a pair of two prong fork members 56 extending outwardly from the cross bar 24 in substantially the same direction as the rods 42. The fork members 56 are spaced from each other as well as from the rods 42. Each fork member 56 has the shape of a block "U" which enables it to receive a pair of skis 61 (see FIG. 6) therewithin in upright, face-to-face orientation. For purposes of this patent disclosure, the term "face-to-face" when applied to a pair of skis is meant to mean that the skis are placed side-by-side with their snow engaging surfaces facing each other.

Releasable closing means are provided for closing the free ends of the fork members 56 adjacent to skis that are retained therein, such that the skis cannot be removed from the free ends of the fork member unless the releasable closing means is released. As illustrated in FIG. 4, the releasable closing means comprises a pair of retainer plates 58. Each retainer plate 58 has a pair of spaced apart openings therein which receive the prongs from of respective fork members 56. The retainer plates 58 are retained on the prongs of the fork members 56 by wing nuts 60.

Figure 6:
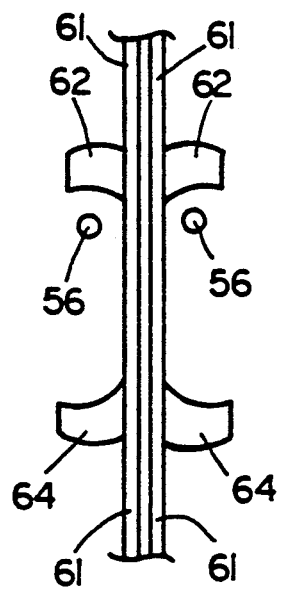
FIG. 6 is a partial elevation showing a pair of skis mounted within the two prongs of the ski mounting member of the carrier.

The retainer plates 58 prevent a pair of skis from sliding out the open ends of the fork members 56 when the plates are properly retained on the ends of the prongs of the fork members 56. To remove the skis, the retainer plates 58 are removed from the prongs of the fork members 56, whereupon the skis can then be removed from the open prongs of the fork members 56. The bindings of the skis prevent the skis 61 from moving upwardly and downwardly through the prongs of the fork members 56 as shown in FIG. 6. The toe mounts 62 of the mountings prevent downward movement of the skis 61, and the heel mounts 64 prevent upward movement of the skis 61 through the prongs of the fork members 56.

Figure 5:
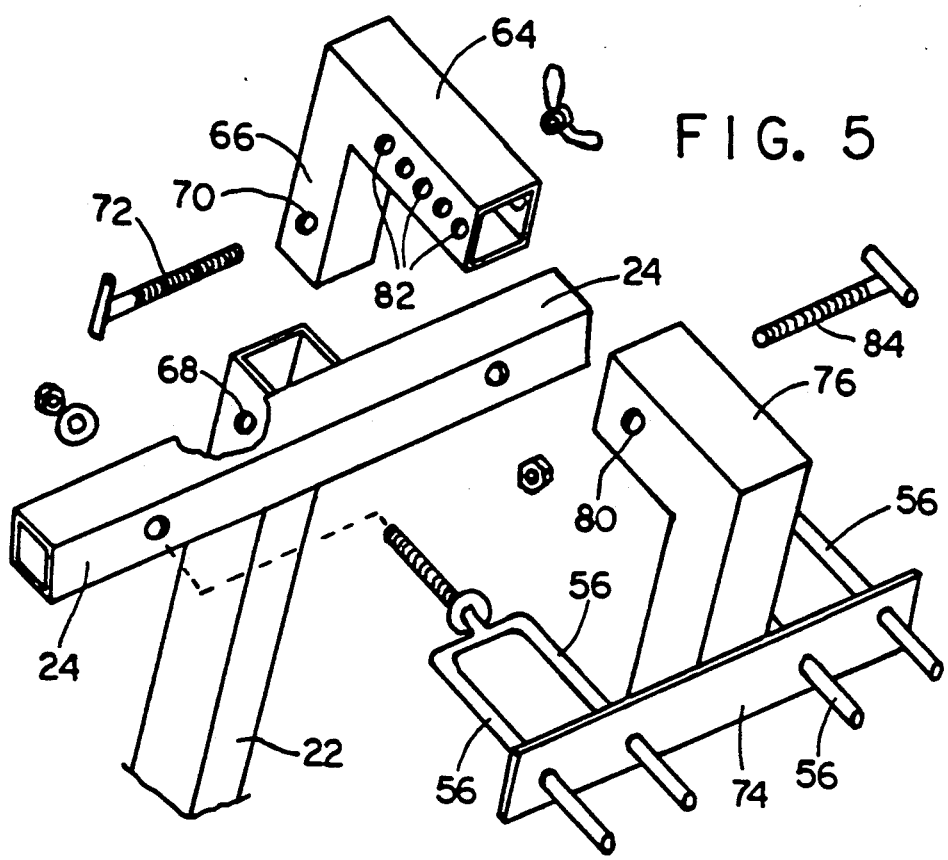
FIG. 5 is a view similar to that of FIG. 4, but showing a modified version of upper portion of the post of the carrier incorporating another embodiment of means for mounting two to four pair of skis thereto.

In FIG. 5 there is shown an embodiment of the invention which is adapted to carry skis only. The means for mounting the skis to the cross bar 24 comprises a pair of two prong fork members 56 extending outwardly from the cross bar 24 in a direction generally away from the motor vehicle on which the carrier apparatus is installed. The fork members 56 have the shape of a block "U" as described previously for receiving a pair of skis therewithin in upright, face-to-face orientation. Releasable closing means are provided for closing the free ends of the fork member adjacent to the skis received in the fork member 56, such that the skis cannot be removed from the free ends of the fork members 56 unless the releasable closing means is released.

A preferred closing means to be used with the carrier for carrying skis only is shown in FIG. 5. The releasable closing means comprises an elongate mounting bar 64 having a mounting stud 66 extending from one end thereof substantially transverse to the elongate axis of the mounting bar 64. The mounting stud 66 is slidably inserted within and withdrawn from the open end of the post 22. At least one transverse opening 68 is provided through the upper end of the post 22, with at least one transverse opening 70 being provided through the mounting stud 66 for alignment with the transverse opening 68 in the upper end of the post 22. A pin 72 is provided for engaging the aligned openings 68 and 70 in the mounting stud 66 and the upper end of the post 22 to retain the mounting stud 66 in the hollow, open and of the post 22.

A retainer plate 74 is mounted to the mounting bar 64 so as to be oriented substantially transverse to the longitudinal axis of the mounting bar 64. The retainer plate 74 is adapted to move back and forth in parallel with the longitudinal axis of the mounting bar 64, with the retainer plate 74 being completely removable from the mounting bar 64. As illustrated, the retainer plate 74 is attached to an L-shaped bar 76 which has a hollow upper leg that slides back and forth over the free end of the mounting bar 64. The retainer plate 77 is mounted at the lower end of the L-shaped bar 76. The retainer plate 74 has openings therein which are in alignment with and receive respective prongs of the fork members 56 for sliding movement along the prongs as the L-shaped bar 76 moves back and forth on the mounting bar 64. The single retainer plate 74 acts to hold skis within the fork members 56 in the same manner as the separate plates 58 of the embodiment shown in FIG. 4.

In the embodiment of FIG. 5, means are shown for releasably securing the retainer plate 74 at selected adjustable positions relative to the prongs of the fork members 56. At least one transverse opening 80 is provided through the leading end of the upper leg of the L-shaped bar 76, with a plurality of spaced, transverse openings 82 being provided through the mounting bar 64 for alignment with the transverse opening 80 in the upper leg of the L-shaped bar 76. A pin 84 is provided for engaging the aligned openings 80 and 82 in the upper leg of the L-shaped bar 76 and the mounting bar 64 to allow adjustable positioning of the L-shaped bar 76 relative to the mounting bar 64.

It is advantageous to provide a stabilizer means that can engage the lower ends of skis or other items being carried by the carrier. The stabilizer means as shown in FIG. 1 comprises an elongate connecting member 90 extending from the lower end of the post 22 in a direction generally away from the mounting plate 12 and support plate 20. A cross piece 92 is mounted to the outer end of the connecting member 90, with the cross piece 92 being oriented substantially transverse to the connecting member 90. At least one strap 94 is attached to the cross piece for strapping lower ends of a pair of skis or the wheels of a bicycle or the lower portion of any item carried by the carrier to the cross piece 94. The elongate connecting member 90 is advantageously connected to the post 22 and the hollow conduit 36 by side plates or extensions extending from the forward end of the connecting member 90. The extensions have openings therein that are adapted to be aligned with the openings in the lower end of the post 22 and the hollow conduit 36. The pin 39 then holds all three members together.

The post itself can be made to telescope so as to vary the effective length thereof. The lower end portion of the post 22 as shown is of a size to accept the upper end portion of the post 22 in sliding telescopic movement. An opening 96 is provided in the upper end of the lower portion of the post and a series of openings 97 are provided in the upper end portion of the post 22. A pin 98 engages the aligned openings in the upper and lower portion of the post 22 to hold the post at a selected, adjustable length.

An advantage of the present invention is that the post and its associated members used in carrying an item such as a bicycle or pair of skis is readily removable from the mounting plate 12 and support plate 20 of the carrier device. The removable items are conveniently stored in the trunk of the motor vehicle when not in use. These items are easily and quickly assembled to the support plate 20 when an item is to be carried by the device. The pins or attachment means holding the various items of the device together in it working form could if desired be provided with locking mechanisms such that the item being carried could not be easily removed and stolen from the carrier.

Although preferred embodiments of the carrier of the present invention have been illustrated and described, it is to be understood that the present disclosure is made by way of example and that various other embodiments are possible without departing from the subject matter coming within the scope of the following claims, which subject matter is regarded as the invention.

I claim:

1. A carrier mounted to the license plate receiver of a motor vehicle for carrying items, said carrier comprising
    a substantially planar mounting plate for attachment to the license plate receiver using the attachment means employed in attaching a license plate to the license plate receiver, with the license plate mounted over the mounting plate;
    a substantially planar support plate firmly connected to the bottom edge of said mounting plate to extend substantially perpendicular from the mounting plate away from the license plate receiver;
    an elongate post;
    means for removably mounting the post generally upright from said support plate;
    a cross bar mounted adjacent to the upper end of said post, said cross bar extending substantially transversely of the post;
    means for mounting the items to be carried to said cross bar; and
    an adjustable foot means associated with said support plate, said foot means extending downwardly from said support plate to rest on a surface of a bumper of the motor vehicle and support the outwardly extending end of said support plate.

2. A carrier in accordance with claim 1, wherein said foot means comprises at least one threaded rod engaged in a respective internally threaded bore in said support plate, with the lower end of said threaded rod having a foot plate for engagement with the bumper of the motor vehicle, said threaded rod further having means at its upper end for turning the rod so as to move the foot plate in an adjustable movement toward or away from the bumper of the motor vehicle.

3. A carrier in accordance with claim 1, wherein the item to be carried is a bicycle, and the means for mounting the bicycle to said cross bar comprises
    two elongate rods attached to said cross bar and spaced from each other, with the rods extending in a direction generally away from said mounting plate and support plate to support a bicycle suspended therefrom; and
    an elongate clamp bar removably coupled to the post and cross bar to extend outwardly from the cross bar in substantially the same direction as said rods, said clamp bar being positioned between said rods to engage the portion of a bicycle supported between said rods and firmly hold the bicycle suspended on said rods.

4. A carrier in accordance with claim 3, wherein said elongate post is hollow;
    said cross bar is mounted to an upper side edge of said post such that the hollow upper end of said post is open;
    said elongate clamp bar has a mounting stud extending from one end thereof substantially transverse to the elongate axis of said clamp bar, said mounting stud being adapted to be inserted within and withdrawn from the open end of said post;
    at least one transverse opening through the upper end of said post;
    at least one transverse opening through said mounting stud for alignment with the transverse opening in the upper end of said post; and
    a pin for engaging the aligned openings in said mounting stud and the upper end of said post to retain said mounting stud in the hollow, open end of said post.

5. A carrier in accordance with claim 3, wherein said foot means comprises at least one threaded rod engaged in a respective internally threaded bore in said support plate, with the lower end of said threaded rod having a foot plate for engagement with the bumper of the motor vehicle, said threaded rod further having means at its upper end for turning the rod so as to move the foot plate in an adjustable movement toward or away from the bumper of the motor vehicle.

6. A carrier in accordance with claim 3, wherein the mounting plate has at least one pair of cross-shaped, spaced apart openings therein for alignment with the threaded receptacles in the license plate receiver of the motor vehicle to accommodate threaded attachment members which extend through said openings and are received in the threaded receptacles for mounting the mounting plate to the license plate receiver.

7. A carrier in accordance with claim 3, wherein the means for mounting the post from said support plate comprises a hollow conduit attached to said support plate and extending upwardly therefrom, with a lower end of said post being removably received longitudinally within said hollow conduit.

8. A carrier in accordance claim 7, wherein the hollow conduit is oriented with its longitudinal axis slanting in a direction away from said mounting plate such that the longitudinal axis forms an acute angle with said support plate of at least about 80 degrees.

9. A carrier in accordance with claim 7, wherein there is further provided
    a transverse opening through the hollow conduit;
    a corresponding transverse opening through the lower end of said post for alignment with the transverse opening in said hollow conduit; and
    a pin for engaging the aligned openings in said hollow conduit and the lower end of said posts to retain said post in said hollow conduit.

10. A carrier in accordance with claim 3 further including ski carrying means comprising
    at least one two prong fork member extending outwardly from the cross bar in substantially the same direction as said rods, with the fork member being spaced from said rods, said fork member having the shape of a block "U" so as to receive a pair of skis therewithin in upright, face-to-face orientation; and
    releasable closing means for closing the free ends of the fork member adjacent to skis received in the fork member, such that the skis cannot be removed from the free ends of the fork member unless the releasable closing means is released.

11. A carrier in accordance with claim 10, further comprising
    an elongate connecting member extending from said post in a direction generally away from said mounting plate and support plate;
    a cross piece mounted to the outer end of said connecting member, said cross piece being oriented substantially transverse to the connecting member; and at least one strap attached to said cross piece for strapping lower ends of a pair of skis to said cross piece.

12. A carrier mounted to the license plate receiver of a motor vehicle for carrying skis, said carrier comprising a substantially planar mounting plate for attachment to the license plate receiver using the attachment means employed in attaching a license plate to the license plate receiver, with the license plate mounted over the mounting plate;

a substantially planar support plate firmly connected to the bottom edge of said mounting plate to extend substantially perpendicular from the mounting plate away from the license plate receiver;

an elongate post;

means for removably mounting the post generally upright from said support plate;

a cross bar mounted adjacent to the upper end of said post, said cross bar extending substantially transversely of the post; and means for mounting the skis to said cross bar comprising at least one two prong fork member extending outwardly from the cross bar in a direction generally away from said mounting plate and support plate, said fork member having the shape of a block "U" so as to receive a pair of skis therewithin in upright, face-to-face orientation; and releasable closing means for closing the free ends of the fork member adjacent to the skis received in the fork member, such that the skis cannot be removed from the free ends of the fork member unless the releasable closing means is released.

13. A carrier in accordance with claim 12, further comprising an elongate connecting member extending from said post in a direction generally away from said mounting plate and support plate;

a cross piece mounted to the outer end of said connecting member, said cross piece being oriented substantially transverse to the connecting member; and at least one strap attached to said cross piece for strapping lower ends of a pair of skis to said cross piece.

14. A carrier in accordance with claim 12, wherein there is further provided adjustable foot means associated with said support plate, said foot means extending downwardly from said support plate to rest on a surface of a bumper of the motor vehicle and support the outwardly extending end of said support plate.

15. A carrier in accordance with claim 14, wherein said foot means comprises at least one threaded rod engaged in a respective internally threaded bore in said support plate, with the lower end of said threaded rod having a foot plate for engagement with the bumper of the motor vehicle, said threaded rod further having means at its upper end for turning the rod so as to move the foot plate in an adjustable movement toward or away from the bumper of the motor vehicle.

16. A carrier in accordance with claim 12, wherein the mounting plate has at least one pair of cross-shaped, spaced apart openings therein for alignment with the threaded receptacles in the license plate receiver of the motor vehicle to accommodate threaded attachment members which extend through said openings and are received in the threaded receptacles for mounting the mounting plate to the license plate receiver.

17. A carrier in accordance with claim 12, wherein the means for mounting the post from said support plate comprises a hollow conduit attached to said support plate and extending upwardly therefrom, with a lower end of said post being removably received longitudinally within said hollow conduit.

18. A carrier in accordance with claim 17, wherein the hollow conduit is oriented with its longitudinal axis slanting in a direction away from said mounting plate such that the longitudinal axis forms an acute angle with said support plate of at least about 80 degrees.

19. A carrier in accordance with claim 17, wherein there is further provided a transverse opening through the hollow conduit;

a corresponding transverse opening through the lower end of said post for alignment with the transverse opening in said hollow conduit; and a pin for engaging the aligned openings in said hollow conduit and the lower end of said posts to retain said post in said hollow conduit.

20. A carrier in accordance with claim 12, wherein said elongate post is hollow;

said cross bar is mounted to an upper side edge of said post such that the hollow upper end of said post is open and said releasable closing means comprises an elongate mounting bar having a mounting stud extending from one end thereof substantially transverse to the elongate axis of said mounting bar, said mounting stud being adapted to be inserted within and withdrawn from the open end of said post;

at least one transverse opening through the upper end of said post;

at least one transverse opening through said mounting stud for alignment with the transverse opening in the upper end of said post;

a pin for engaging the aligned openings in said mounting stud and the upper end of said post to retain said mounting stud in the hollow, open end of said post;

a retainer plate;

means for mounting the retainer plate to said mounting bar for movement back and forth in a direction parallel with the longitudinal axis of said mounting bar, with said retainer plate being oriented substantially transverse to the longitudinal axis of said mounting bar;

transverse openings through said retainer plate which are in alignment with and receive respective prongs of said fork members for sliding movement along said prongs as said retainer plate moves relative to said mounting bar; and means for releasably securing said retainer plate securely to said mounting bar at adjustable positions in the travel of said retainer plate relative to said mounting bar.

* * * * *